(12) United States Patent
Locher et al.

(10) Patent No.: US 6,554,381 B2
(45) Date of Patent: Apr. 29, 2003

(54) SYSTEM FOR REGISTRATION OF A FLUID LEVEL IN A RECEPTACLE

(75) Inventors: Philippe Georges Locher, Egg (CH); Markus Bürgin, Uster (CH); Joachim Kretschmer, Rüti (CH)

(73) Assignee: Pelikan Produktions AG (CH)

( * ) Notice: Subject to any disclaimer, the term of this patent is extended or adjusted under 35 U.S.C. 154(b) by 0 days.

(21) Appl. No.: 09/836,004

(22) Filed: Apr. 17, 2001

(65) Prior Publication Data

US 2002/0005869 A1 Jan. 17, 2002

(51) Int. Cl.[7] ................................................. B41J 2/195
(52) U.S. Cl. ........................................... 347/7; 250/577
(58) Field of Search .................... 347/7, 19; 73/290 R; 250/343, 221, 903, 577

(56) References Cited

U.S. PATENT DOCUMENTS 6,012,794 A * 1/2000 Nakano et al. ................. 347/7
6,361,136 B1 * 3/2002 Watanable et al. ............. 347/7
6,390,590 B1 * 5/2002 Hansburg ..................... 347/19

* cited by examiner

Primary Examiner—David F. Yockey
Assistant Examiner—Ly T Tran
(74) Attorney, Agent, or Firm—Fay, Sharpe, Fagan, Minnich & McKee, LLP (57) ABSTRACT

A system is provided for registration of a fluid level of a fluid in the fluid chamber of an invention-specific receptacle (1), in particular of ink in an ink cartridge, with a light source (11) which beams into the chamber of the receptacle, a reflection body (2) which is designed as a float, which moves in the chamber of the receptacle in dependency upon the filling level of the fluid and which variably reflects the light in dependency upon its movement, and a light detector (10) which receives a variable amount of light.

58 Claims, 9 Drawing Sheets

SYSTEM FOR REGISTRATION OF A FLUID LEVEL IN A RECEPTACLE

BACKGROUND OF THE INVENTION

The present invention concerns a system for ascertaining a fluid level in a receptacle and, in particular, to an ink cartridge for an inkjet printer and an associated receptacle.

Such a system and/or an associated receptacle is described in EP 0 860 284 A2. The known fluid level recognition system serves for detection of whether or not fluid or ink is present in the receptacle chamber of an ink receptacle or an ink cartridge. Into the receptacle wall of the known receptacle is integrated a fixed and transparent deviating prism, which projects into the chamber. The deviating prism is irradiated by a light source outside the receptacle, and redirects the light to an external photo detector when the receptacle is empty. If the receptacle is filled, the beam of light enters through the deviating prism into the liquid and is there randomly diffused. No light is returned back to the photo detector. The known system is thus essentially only capable of recognizing the state of emptiness of the receptacle.

It is desired to provide a system for determining a fluid level in a receptacle and an associated receptacle, by means of which it is possible to register several fluid level stages.

SUMMARY OF THE INVENTION

A system is provided for ascertaining a fluid level of a fluid in a fluid chamber of a receptacle, in particular of ink in an ink cartridge, including a light source, which shines into the chamber of the receptacle, a reflection body or a reflector, which is designed as floating body, which moves about in the chamber of the receptacle, dependent upon the fill level of the fluid and which variably reflects the light dependent upon its movement or attained position or location, and a light detector or photo detector, which, dependent upon the movement of the reflection body, receives variable amounts of light.

As a result of the movement of the reflector in dependency upon the level of fluid in the receptacle chamber, the system according to the invention facilitates the detection of different fluid levels or several level stages or also continuous level registration.

The reflection body can have several identically or differently shaped recesses on its surface so that, depending upon movement, different fill level phases can be registered.

The reflection body, in essence, is preferably a cylinder, in which extends at least one cylindrical hollow space parallel to a central axis of the cylinder and extending continuously between the end surfaces of the cylinder. With such construction it is possible to achieve a level-dependent rotation of the reflector around its axis and a correspondingly variable reflection and thereby detection of light.

A guiding mechanism is selectively provided which guides the reflection body in its movement with the level of fluid in the fluid chamber of the receptacle. The guiding mechanism facilitates a straight-line level-dependent movement of the reflection body over a specified distance.

The reflection body may be a float unit which is arranged, by means of a flexible or rigid suspension, at a lid or a wall of the receptacle.

The reflection body can have a recess on its surface, whose walls or surfaces deviate the light beam from the source of light and which thus acts as deviation level or deviation reflector.

The reflection body can be a float unit in form of a transparent prism or deviation prism, which moves along with the fluid level inside the receptacle.

The present invention, moreover, relates to a receptacle, in particular for ink of an inkjet printer, having a receptacle wall, which encloses a fillable and evacuatable fluid chamber of the receptacle, and with a reflection body which is designed as float unit, which moves in the fluid chamber of the receptacle in dependency upon the fill level and which variably reflects linked-up light in dependency upon its movement or attained position or location within the fluid chamber.

Additional application possibilities of the invention are, for example, the color reservoir of a printing device, the water tank of a coffee machine, a water boiler, etc., a gasoline tank, a toilet flushing tank or, for example an air humidifier or a water level indicator in the field of hydroculture.

Additional benefits, beneficial modifications or application possibilities of the present invention are apparent from the following description of preferred specific embodiments of the invention, together with the drawings.

BRIEF DESCRIPTION OF THE DRAWINGS

FIG. 6 is a bird's eye view of the receptacle viewed in direction VII of FIG. 6;

DETAILED DESCRIPTION OF THE PREFERRED EMBODIMENTS

The following contains a detailed description and explanation of a first specific embodiment of the system according to the invention and the invention-specific receptacle, making use of FIGS. 1–8.

Figure 1:
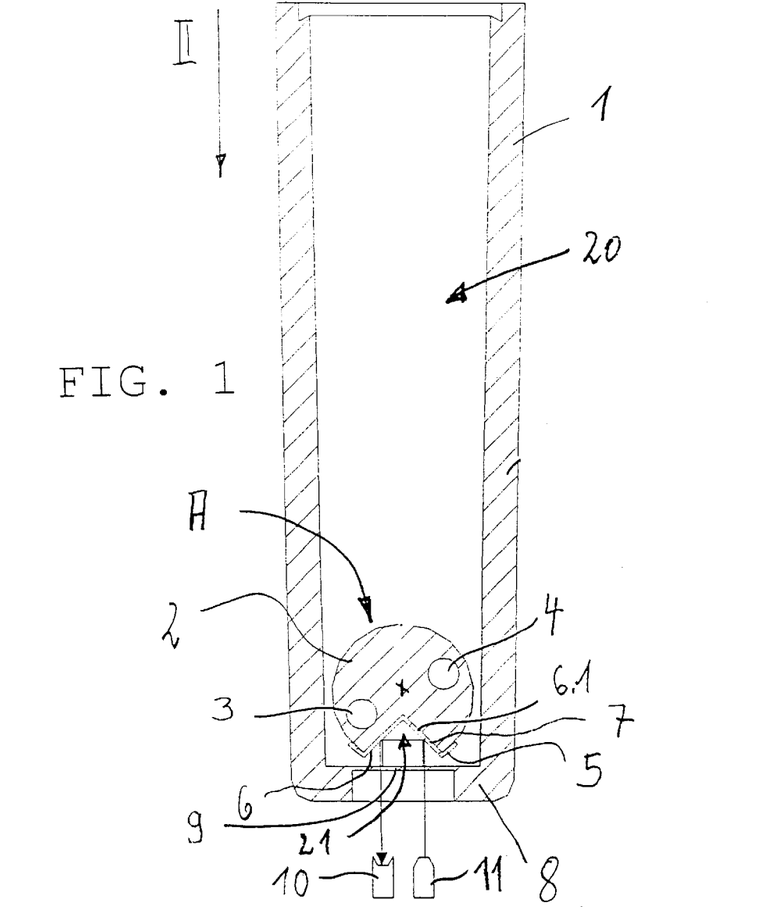
FIG. 1 is a cross-sectional view through a receptacle of a first specific embodiment of the invention-specific system along line 1 in FIG. 2.
Figure 2:
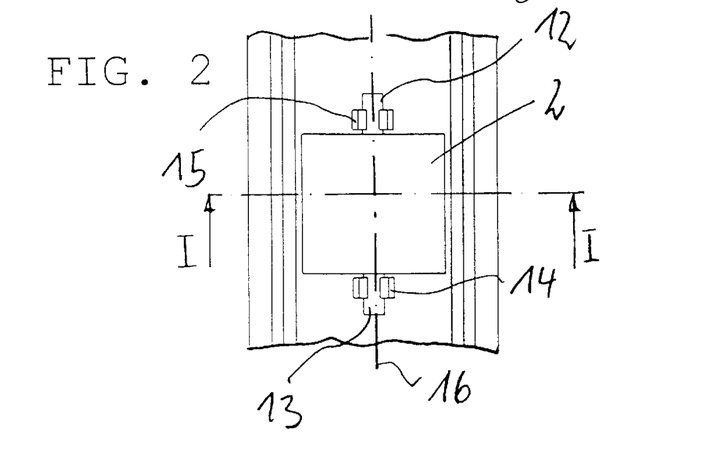
FIG. 2 is a bird's eye view of the receptacle of FIG. 1, viewed in the direction of arrow II of FIG. 1, with the receptacle being empty.
Figure 3:
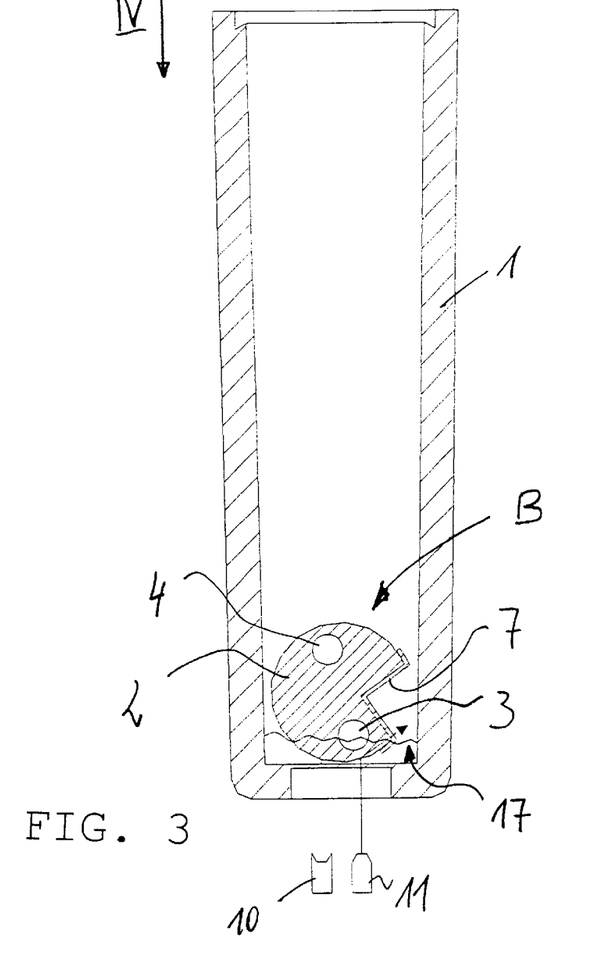
FIG. 3 is a cross-sectional view of the receptacle according to FIG. 1, with low fluid level in the fluid chamber, viewed along line III of FIG. 4.
Figure 4:
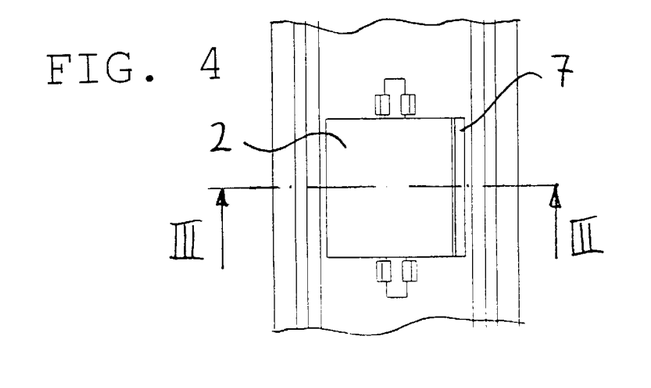
FIG. 4 is a bird's eye view of receptacle of FIG. 3, viewed in direction IV of FIG. 3.
Figure 5:
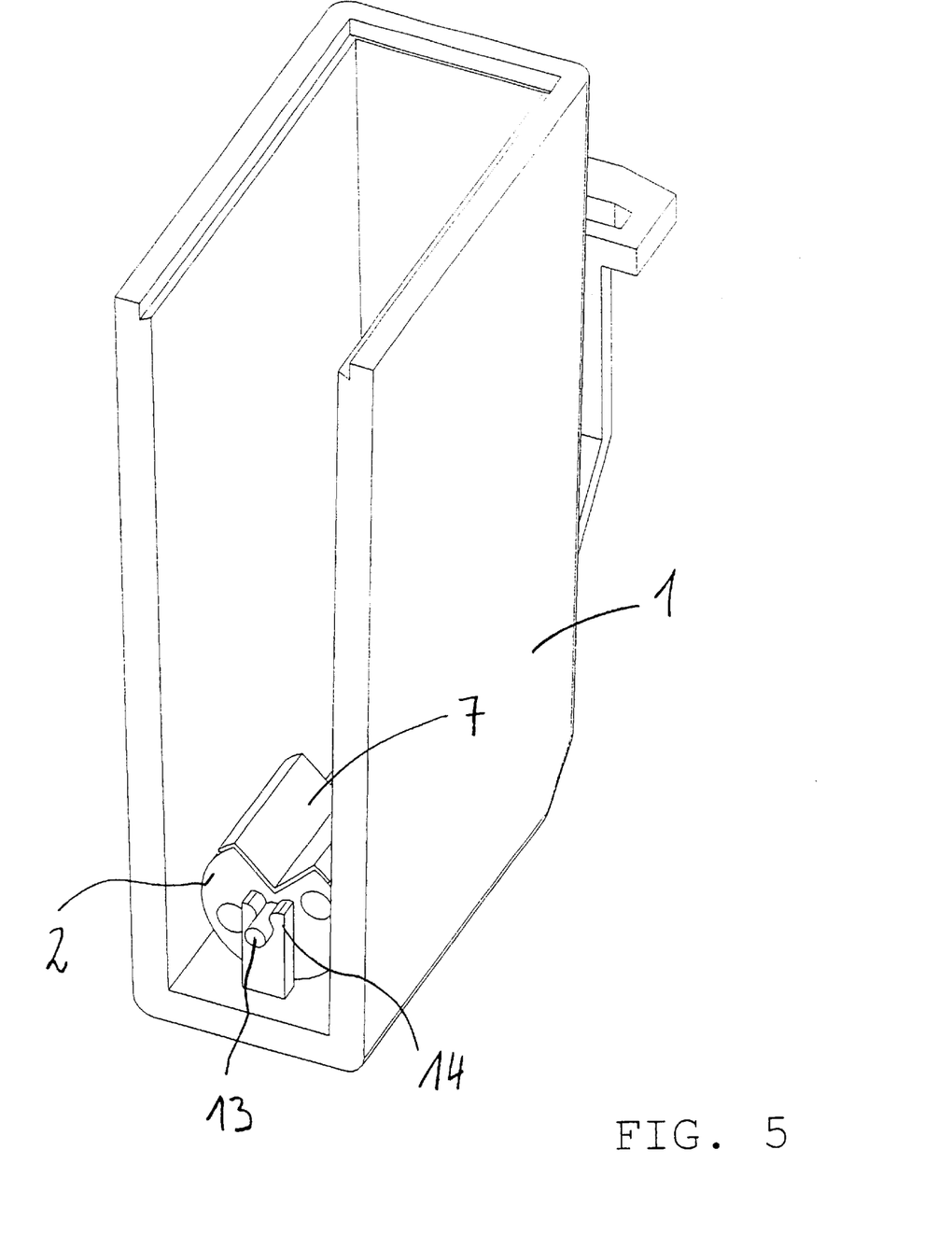
FIG. 5 is a perspective view of the receptacle according to FIGS. 1 to 4, with the receptacle being open and one side wall of the receptacle having been omitted.

FIGS. 1 and 2 depict the first specific embodiment of the present invention in state A, when receptacle 1 is empty. FIGS. 3 and 4 depict the first specific embodiment of the invention-specific device in state B, when the fluid level or the fluid status in receptacle 1 is low or very low. FIGS. 5 to 8 depict the first specific embodiment of the invention-specific device in state C, when the fluid level in the receptacle 1 is high or when the receptacle 1 is full.

The first specific embodiment of the invention-specific system according to FIGS. 1 to 8 comprises, in essence, a light-impermeable reflection body 2 in form of a cylinder or a roll, a light source 11, which emits a beam of light in the direction of the reflection body 2, and a light receptor 10 or light detector, which receives light beamed back or reflected by the reflection body 2. The reflection body 2 is arranged in a chamber 20 of a receptacle 1, said chamber serving for acceptance of fluid, for example of ink in case of an ink cartridge.

The reflection body 2 is arranged in the vicinity of or at the bottom 8 of receptacle 1. In bottom 8 is provided a thin transparent window through which the light beam enters from the light source 11 into the chamber 20 of receptacle 1 and through which reflected light from reflection body 2 can exit in such manner that it falls on the light detector 10.

The reflection body 2 is preferably designed in the shape of a cylinder or a roll, which has a circumferential surface and two opposing end surfaces. A recess 21 is designed at the circumference of the cylinder or at the reflection body 2. The reflection body 2 has, in addition, two hollow spaces 3 and 4 or chambers which extend continuously between the two end surfaces of the reflection body 2 and which are parallel to each other and parallel to a center axis 16 of the reflection body 2. The two hollow spaces 3 and 4 have a cylindrical cubical contents and are capable of accepting fluid therein since they are open at the end surfaces.

In recess 21 of the reflection body 2 is preferably arranged a reflecting insert 7, for example of metal, fixed, for example, by means of glue, said insert having a higher density than the remaining cylinder. The recess 21 has two intersecting side surfaces, on which the insert 7 is positioned. The appropriate side walls 6 and 6.1 of the insert 7 are respectively equipped at their end surfaces, at the circumference of the cylinder, with a prolongation 5 which is positioned on the circumference of the reflection body 2. The recess 21 and the insert 7 extend, without interruption, between the two end surfaces and across the cylinder or the reflection body 2.

The circumference of the reflection body 2 is phased outside recess 21 in such manner that its outline in cross-section represents a regular polyhedron, as can be seen in FIG. 1. At the two end surfaces, the reflection body 2 is respectively provided with a journal 12 or 13, by means of which the reflection body 2 is arranged, rotatably around its center axis 16, in corresponding bearing journal seats 15 or 14. The journal seats 15 or 14 are located at the free ends of journal supports, which are fastened at bottom 8 in the fluid chamber 20 of the receptacle 1. The journal seats 15 and 14 are designed as snap seats for the journals 12 and 13 of the reflection body 2, they retain the reflection body 2 when journals 12 and 13 are locked in the journal seats 15 or 14 and ensure the rotating capability of the reflection body 2 around its center axis 16.

Figure 8:
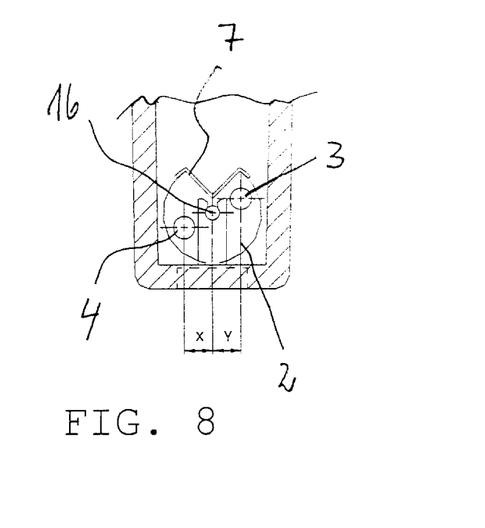
FIG. 8 is a partial cross-section through the receptacle as in FIG. 6.

FIG. 8 shows the preferred reciprocal arrangement of the hollow spaces 4 and 3 vis-a-vis the recess 21 or the insert 7 and the center axis 16 of the reflection body 2. If one proceeds from a fictitious plane in which the center axis 16 of the reflection body 2 lies, and which sub-divides the reflection body 2 into a first half and a second half, then the recess 21 and the insert 7 as well as the hollow space 3 are formed or otherwise provided in a first half of the reflection body 2, while the hollow space 4 is provided in the other or second half of the reflection body 2, which is sub-divided by the fictitious plane. The hollow spaces 3 and 4 can, more precisely, be designed in such manner that their center axes together with the center axis 16 of the reflection body 2 are positioned in an additional, hypothetical plane, whereby said additional fictional plane is at an oblique angle relative to the first plane and the first plane intersects in the center axis 16 of the reflection body. The distance of the center axis of hollow space 4 relative to the center axis 16 is equal to the distance of the center axis of the hollow space 3 relative to the center axis of the reflection body 2.

A luminous diode is preferably utilized as light source 11 of the system according to the invention. A photo detector, for example a photo diode, a pin diode or for example an avalanche photo diode is preferably used as light receiver 10. The light source 11 or the light emitter and the light detector 10 can be integrated into one unit. The output of the opto-electronic light detector 10 is connected with a signal generating and analyzing electrode (not shown), which processes the signal from the light detector 10 and registers it. Prior to filling the receptacle 1 with a fluid, for example ink in case of an ink cartridge for an inkjet printer or similar, the reflection body 2 is in the stable position A, which is represented in FIGS. 1 and 2.

In Position A, i.e. with empty or unfilled receptacle 1, the reflection body 2 positioned in receptacle 1 is in a position or location in which the reflecting insert 7 within the recess 21 is precisely aligned vis-a-vis the window 9 of bottom 8 of receptacle 1. The light beam from the light source 11 then falls, after passage through window 9, upon the area 6.1 of insert 7, is diverted by 90° from this area to area 6 of insert 7 and again diverted from area 6 by 90° in the direction toward the window 9 and thus reflected to the light detector 10. The insert 7 in the recess 21 thus acts in position A with empty receptacle 1 as deviation level or deviation reflector, whereby the light beam emitted by the light source and the light beam reflected by the reflection body 2 are parallel with each other outside the receptacle 1.

With rising fluid level in the fluid chamber 20 of receptacle 1, the reflection body 2 starts to turn from the position A of FIG. 1 and assumes, for example, the position B of FIGS. 3 and 4.

The reason for the rotational movement of the reflection body 2 must be regarded in the fact that the reflection body 2 is designed, overall, as a float with resulting lifting force. The design of the reflection body 2 as a float alone does not lead directly to a rotational movement of the reflection body 2 when the fluid level changes in the fluid chamber 20 of the receptacle 1. The rotational movement due to the applied lift of the reflection body 2 is generated alone or in part via an uneven or asymmetrical mass distribution of the reflection body 2. Said uneven mass distribution can be attained for example by means of an asymmetrical material accumulation relative to the center axis 16 of the reflection body 2. In the first specific embodiment, said asymmetrical or uneven mass distribution is obtained by the recess 21, the insert 7 in the recess 21 and the two hollow spaces 3 and 4, which interact in such manner that the resulting, to the reflection body 2 applied lifting force no longer intersects the central axis (16), thereby generating a turning moment, turning the reflection body 2 from the position A (compare FIG. 1) into position B (compare FIG. 3) and further into position C (compare FIG. 6) which indicates high filling level or a full receptacle 1.

Figure 6:
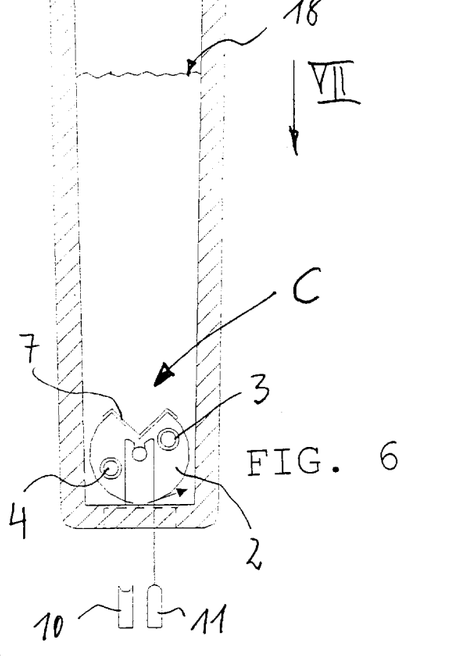
FIG. 6 is a cross-sectional view of the receptacle according to FIGS. 1–5 along sectional line VI—VI in FIG. 7, with high fluid level existing in the fluid chamber.
Figure 7:
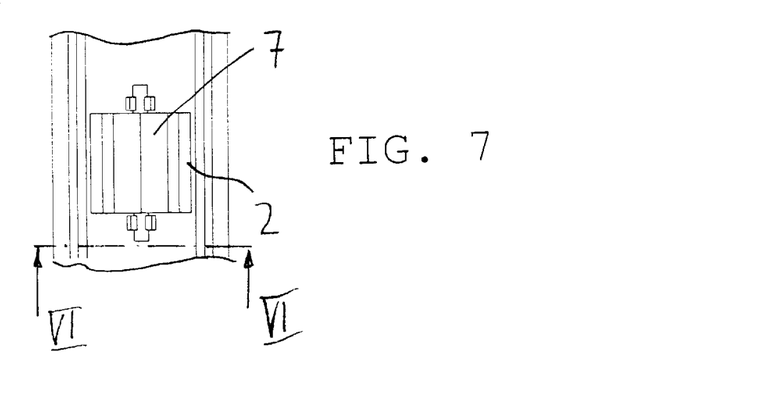

In the position C with filling level 18, for example, the reflection body 2 is then again in a stable position. With rotation from position A in which, as mentioned, the recess 21 with insert 7 is 10 aligned vis-a-vis to window 9, i.e. in the direction of the light detector 10 into position C, in which the recess 21 with insert 7 is in the opposite position vis-a-vis position A, in other words pointing exactly away from the bottom of receptacle 1 and no longer within the incidence region of the light beam of light source 11, the light beam of light source 11 is reflected at the phased circumference of the reflection body 2 in such manner that it no longer reaches the light detector. Thus, at the exit of the light detector 10 there is no longer any signal which is tantamount to the statement that the receptacle is "full". The reflection body 2 thus moves in dependency on the filling level of the fluid in the fluid chamber 20 of receptacle 1 and the light detector 10 receives a variable amount of light dependent upon said movement or rotational movement of the reflection body 2.

With growing evacuation, in other words with sinking fluid level in receptacle 1, the reflection body 2 moves from the position C into the position A when the fluid level recedes to zero. The movement from position C for "full" receptacle into position A for "empty" receptacle is produced by means of said uneven distribution of mass, in other words by an imbalance in weight. This imbalance in weight leads to a resulting force or weight force, which no longer intersects the central axis 16 of cylinder 2 and thus generates a torsion moment impinging upon the reflection body 2, said torsion moment causing the rotational movement of the reflection body 2 from the position C into the position A. The recess 21 with insert 7 then again attains position A, where the insert 7 serves as deviating level for the light beam for light source 11 to the light detector 10. The light detector 10 then emits an electrical signal which indicates the empty state of the receptacle 1.

Figure 9:
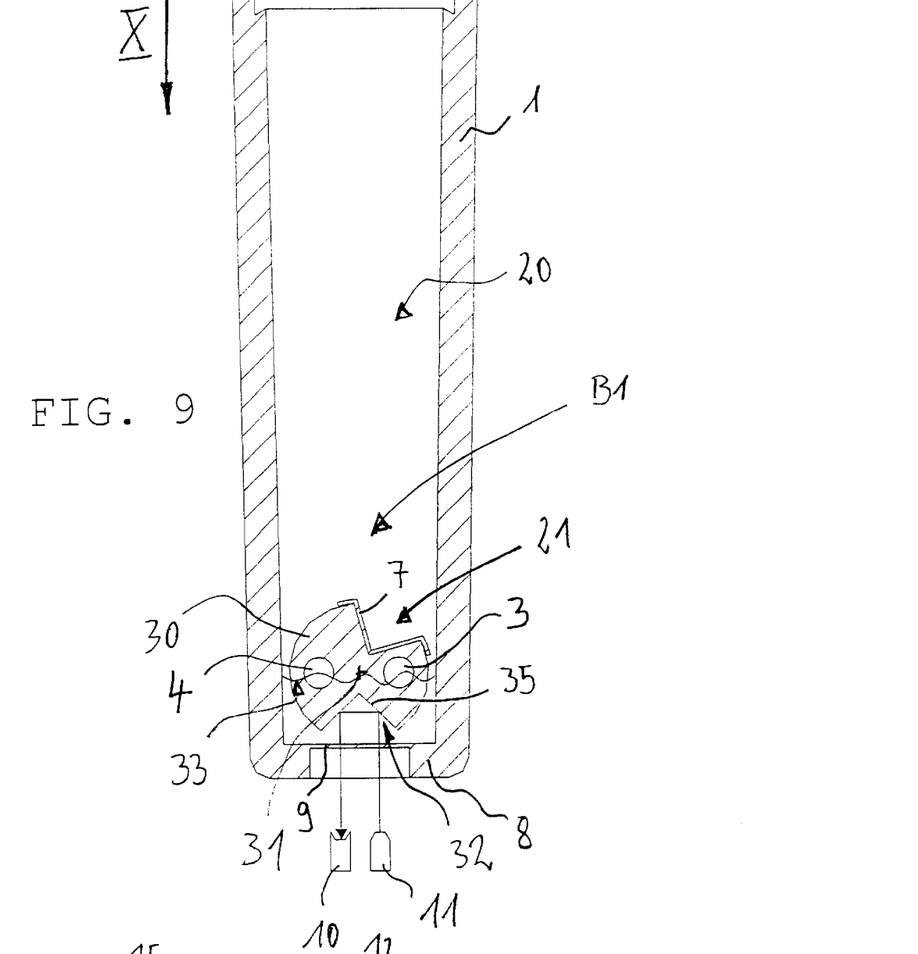
FIG. 9 is a cross-sectional view of an invention-specific receptacle with a second specific embodiment of the system according to the invention, viewed along sectional line IX—IX in FIG. 10.
Figure 10:
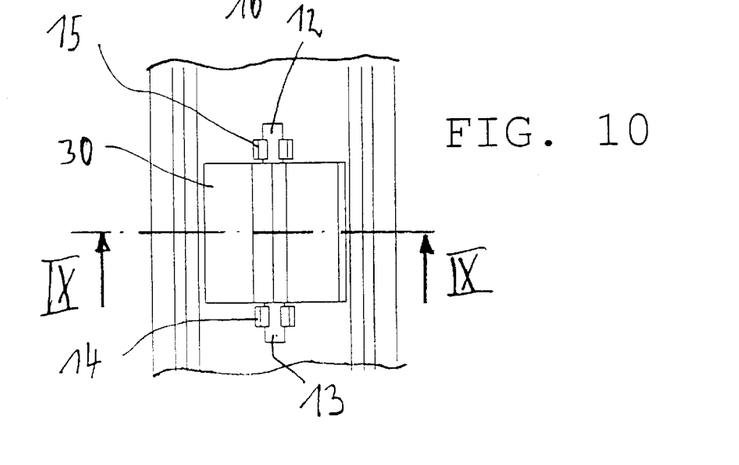
FIG. 10 is a bird's eye view of the receptacle of FIG. 9, viewed in direction X of FIG. 9.

The following contains a detailed description and explanation of a second specific embodiment of the system according to the invention, making use of FIGS. 9 and 10. The second specific embodiment of the system according to the invention presents a light impermeable reflection body 30. In addition, the second specific embodiment, like the first specific embodiment of the invention according to FIG. 1, has a light source 11, which emits a light beam in direction of the reflection body 30, and a light detector 10, which receives light reflected from the reflection body 30. The reflection body 30 is again arranged, as in the first specific embodiment, in chamber 20 of a receptacle 1, which serves for acceptance of fluid, for example ink. The reflection body 30 is located in the vicinity of or at the bottom 8 of the receptacle 1. In bottom 8 is provided a transparent window 9, through which the light beam from the light source 11 enters into the chamber 20 of the receptacle 1 and through which reflected light from the reflection body 30 can exit from the fluid chamber 20 of the receptacle 1 in such manner that it falls upon the light detector 10.

The reflection body 30 is laid-out as float and designed in basic cylindrical shape, said cylinder comprising a circumferential surface and two opposing end surfaces. The cylinder or the reflection body 30 has a recess 21 with insert 7 and two hollow spaces 3 and 4 or chambers, whereby elements 3, 4, 7 and 21 are designed according to FIG. 1, the same as in the first specific embodiment, having, also, the same functions and effects.

In difference to the first specific embodiment, the reflection body 30 has, however, at its circumference, another recess 32, which is provided approximately opposite the recess 21 at the circumference. The two interior surfaces 35 of recess 32 extend orthogonal to each other between the two end surfaces of the reflection body 30. Otherwise, the circumferential surface of the reflection body 30 in the area outside the recesses 21 and 32 is phased as in the first specific embodiment. At the two end surfaces, the reflection body 30 has again a journal neck 12 or 13, by means of which the reflection body 30 is positioned, rotatably around its center axis 31 in corresponding journal seats 15 or 14. The journal seats 15 or 14 are located, as in the first specific embodiment, at the free ends of journal supports. Elements 12 to 16 of the second specific embodiment have the same construction and the same properties as in the first specific embodiment. Overall, the components and fittings of the second specific embodiment bearing the same reference symbols as in the first specific embodiment according to FIGS. 1 to 8, have also the same construction and same function as in the first specific embodiment. Reference in this regard is made, therefore, to the explanations with respect to the first specific embodiment. In particular, the explanations relative to the positions A, B and C of the first specific embodiment also apply with respect to the rotational movement and operating mode of the second specific embodiment of the invention.

In difference to the first specific embodiment, however, the second specific embodiment has, in addition, the recess 32, whose function is explained below by means of the position B1 of FIG. 9.

In position B1, the filling level 33 of the fluid in receptacle 1 is relatively low, in other words between the filling level "full" of position C and the filling level "empty" of position A. The filling level 33 of position B1 can be designated, for example as "almost empty". In the stable position B1, the center axes of the two hollow spaces 3 and 4 and the center axis 31 of the reflection body 30 are in one common plane which extends parallel to the bottom 8 of receptacle 1. In the depicted position B1, the recess 32 of the reflection body is aligned exactly opposite window 9 of receptacle 1. The two interior surfaces 35 of recess 32 then serve for deviating the light from the light source 11 to the light detector 10, which, triggered by the reception of light, emits an electrical signal, which has the meaning filling level "almost empty".

The evaluation electronic (not shown) arranged behind the light detector 10 is by itself not able, based on the signals from the light detector 10, to distinguish whether the position A exists with filling level "empty" or the position B1 with filling level "almost empty". It can, however, make the distinction with another signal at the exit of the light detector, based on the chronological sequence of signals in accordance with the rotational movement of the reflection body 30 and thereby the change in filling level, proceeding from the position C "full" with no signal at the exit of the light detector 10 via the position B1 "almost empty", with a signal at the exit of the light detector in the position A "empty".

Figure 11:
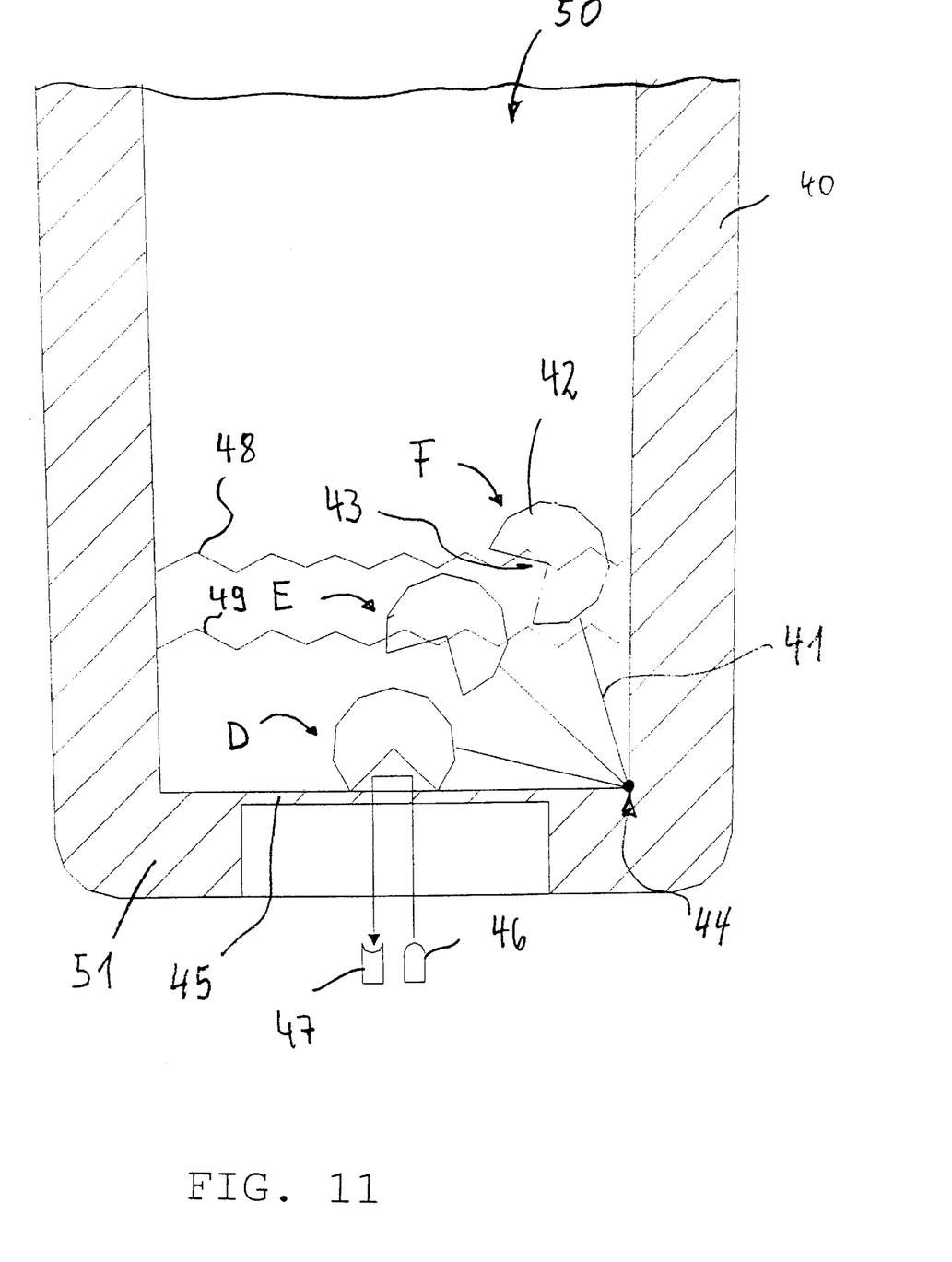
FIG. 11 is a cross-section through a receptacle according to the invention with a third specific embodiment of the invention-specific system.

A third specific embodiment of the invention is represented in FIG. 11. The system comprises a receptacle 40 with a bottom 51, in which is provided a transparent, light-permeable window 45, a reflection body 42 in chamber 50 of the receptacle 40, a light source 46, which emits light into the chamber 50 and a light detector 47, which detects light from the chamber 50.

The reflection body 42 is light-impermeable, designed as a float and has the shape of a cylinder with a circumferential surface and two end surfaces. At the circumferential surface, the reflection body 42 is equipped with a recess 43 with two inner surfaces which extend orthogonal to each other and form a reflector segment or a deviating level of the reflection body 42. The inner surfaces of the recess 43 are identical in size. The recess 43 extends between the end surfaces of the reflection body 42.

The reflection body 42 is connected by means of a rigid suspension 41 with an articulation 44 at the bottom 51 of the receptacle 40. The articulation and the suspension 41 are depicted schematically in FIG. 11. The reflection body 42 thus moves on a circular path around an articulation axis of the articulation 44 when there is a change in the filling level of the fluid inside the receptacle 40.

If fluid is removed from the previously full receptacle 40, then the fluid level in the fluid chamber 50 of the receptacle 40 sinks, for example, to fluid level 48 and the reflection body 42 is then in position F. The light, which is beamed from the light source 46 into the receptacle 40 is then not reflected by the reflection 42 but instead diffusely distributed and absorbed in the fluid chamber 50 of receptacle 40 in such manner that it does not reach the light detector. At the exit of the light detector no signal is then generated, which means the same as filling level "full".

If more and more fluid is removed from the receptacle 40, the fluid level continues to drop and reaches, for example, via level 49, at which the reflection body 42 is in the position E, level zero, at which the receptacle is empty and the reflection body 42 is located on the bottom 51 of receptacle 40 in position D. The inner surfaces of the recess 42 in the position D deviate the light from the light source 46 and reflect it back to the photo detector 47, which generates, at its exit, an electrical signal, which indicates a filling level of "empty".

Figure 12:
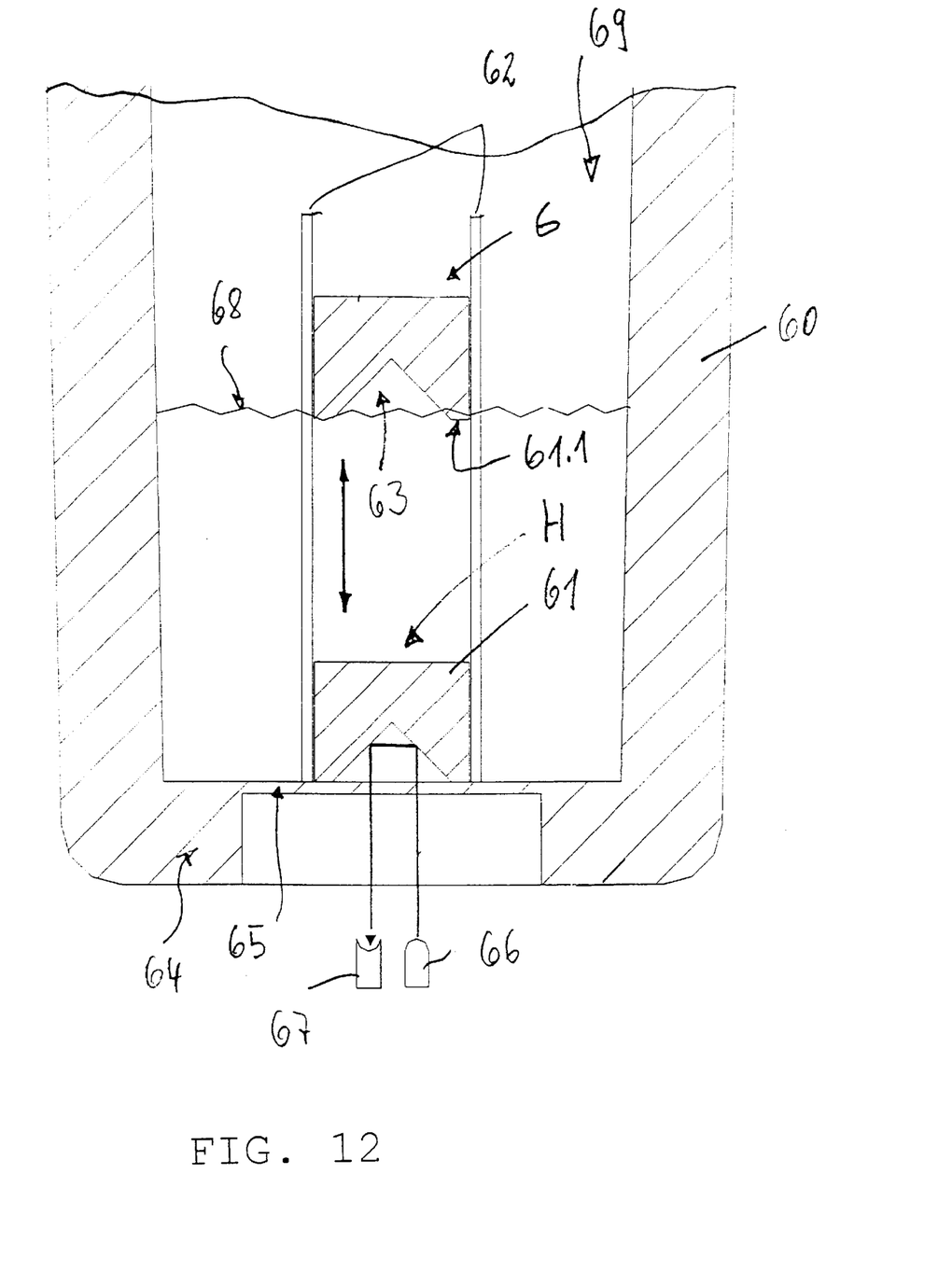
FIG. 12 is a cross-section through an invention-specific receptacle with a fourth specific embodiment of the system according to the invention.

A fourth specific embodiment of the invention is depicted in FIG. 12. The system comprises an invention-specific receptacle 60 with a bottom 64 in which is provided a transparent, light-permeable window 65, a reflection body 61 in the fluid chamber 69 of receptacle 60, a light source 66, which emits light into the chamber 69 of receptacle 60, and a light detector 67, which detects light from the chamber 69 or from the receptacle 60.

The reflection body 61 is light-impermeable, is designed as a float and has the shape of a cuboid with an underside 61.1 which points towards the bottom 64 of the receptacle 60. At the underside, the reflection body 61 has a recess 63 with two inner surfaces or side surfaces, which extend in V-shape or orthogonal toward each other and which form a reflector segment or a deviating level of the reflection body 61. The side surfaces of the recess 63 have the same size. The recess 63 extends continuously at the underside of the reflection body 61.

The reflection body 61 is guided in a guideway 62 in its movement with the fluid level. The guideway 62 can be realized, for example, as spring-groove system, which is arranged at two opposing external sides of the reflection body 61. The reflection body 61 moves in a straight line together with the fluid level, whereby the recess 63 always points toward the window 65 of the receptacle 60 and the underside 61.1 of the reflection body 61 is parallel to the level window 65.

If fluid is removed from the formerly full receptacle, the fluid level in the fluid chamber 69 of the receptacle 60 then drops for example to fluid level 68 and the reflection body 61 is then in position G. The light which is beamed from the light source 66 into the receptacle 60, perpendicular to the transparent window 65, is then deflected at the interior surfaces of the reflection body 61 and thrown again back to window 65. On the way to the reflection body 61 and back to the window 65, the light beam is, however, attenuated in the fluid to such extent that only a fraction of the light intensity generated by the source of light reaches the light detector 67 after deflection. The amount of light detected by the light detector 67 is for example so small that it is below a sensitivity threshold of the light detector 67 or below a specified detection threshold of the light detector 67. The light detector 67 therefore does not emit a signal which has the same meaning as "full" filling level.

If more and more fluid is removed from the receptacle, the fluid level continues to drop until the reflection body 61 is positioned on the bottom 64 in the fluid chamber 69 of the receptacle 60. The reflection body 61 is then in the depicted position H and a zero fluid level exists, at which the receptacle 60 is empty. The orthogonal side surfaces of the recess 63 then redirect in position D the light from the light source 66 and reflect it back to the photo detector 67. The received light intensity lies then above the detection threshold of the light detector 67, which, consequently, generates at its exit an electrical signal which indicates a filling level of empty.

Figure 13:
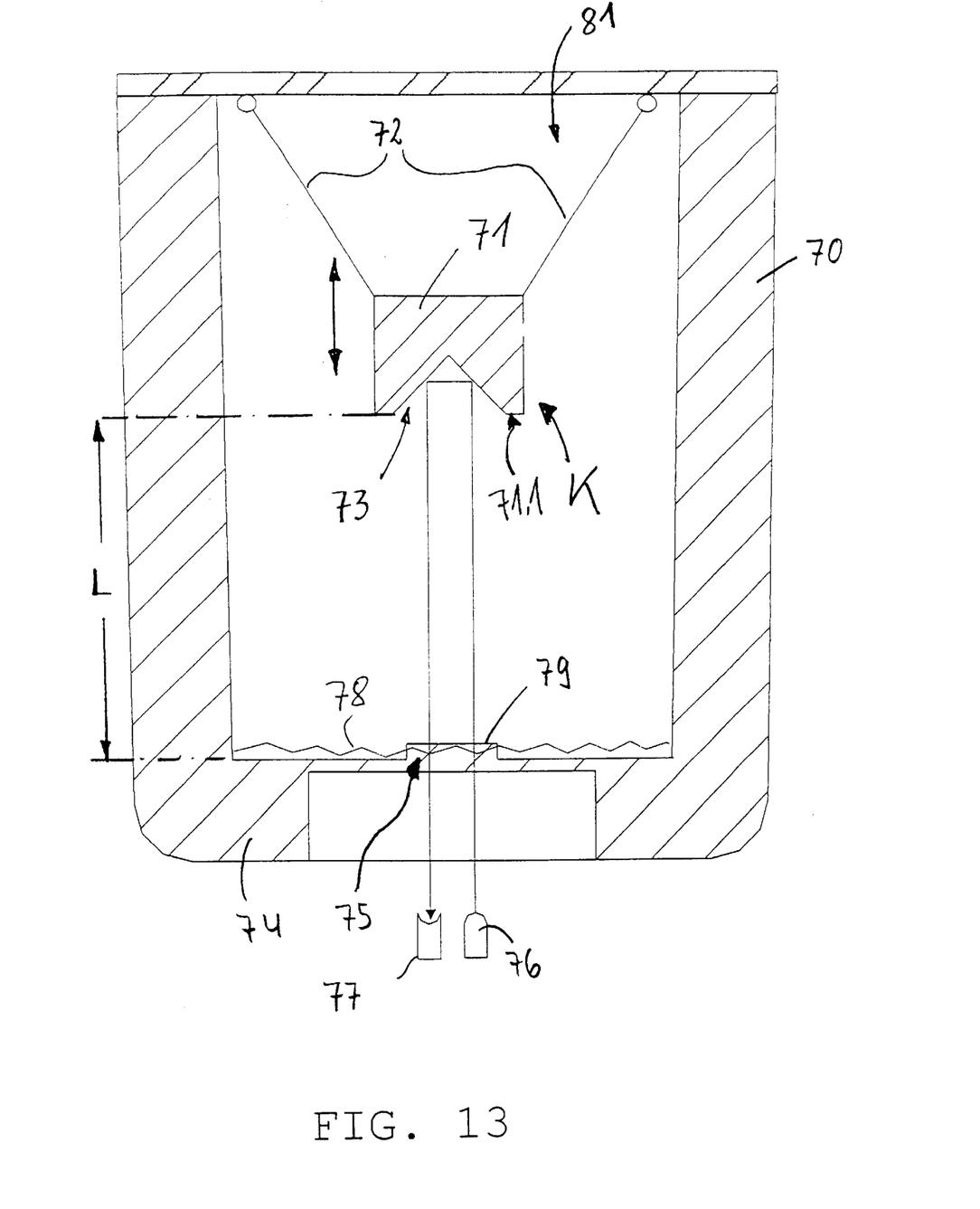
FIG. 13 is a cross-section through an invention-specific receptacle with a fifth specific embodiment of the system according to the invention; and, FIG. 14 is a cross-section through an invention-specific receptacle with a sixth 6 specific embodiment of the present invention.

FIG. 13 depicts a fifth specific embodiment of the invention. The system comprises a receptacle 70 according to the invention with a bottom 74, in which a transparent, light-permeable window 75 is located with a central elevation or a centrally arranged projection 79, which protrudes into chamber 81 of the receptacle 70, a reflection body 71 in the chamber 81 of the receptacle 70, a light source 76, which emits light into chamber 81 of the receptacle 70 and a light detector 77, which detects light from the chamber 81 or from the receptacle 70.

The reflection body 71 is light-impermeable, is designed as a float and has the shape of a cuboid with an underside 71.1 which points toward the bottom 74 of the receptacle 70. At the underside 71.1 the reflection body 71 has a recess 73 with two inner surfaces or side surfaces which extend toward each other in V-shape or orthogonally, and which form a reflector segment or deviation reflector or a deviation level of the reflection body 71. The side surfaces of the recess 73 are equal in size. The recess 73 extends continuously at the underside 71.1 of the reflection body 71.

The reflection body 71 is attached to a suspension 72, which, in turn, may be arranged, in the upper region of receptacle 70 for example at its lid, as represented in FIG. 13, or at the side walls. The suspension 72 may be designed flexibly so that the reflection body 71 can move together with the fluid level, along a straight path, which is determined or limited by suspension 71. The suspension 72 can be composed, for example, of one or several flexible straps or rods. The recess 73 of the reflection body 71 always points towards the window 75 of the receptacle 70 and the underside 71.1 of the reflection body 71 is parallel to a window 75.

If fluid is removed from the formerly full receptacle 70, the fluid level in the fluid chamber 81 of the receptacle 70 continues to drop until the reflection body 71 is freely suspended in the fluid chamber 81 of receptacle 70, as is depicted, for example, with position K of reflection body 71 in FIG. 13. In the position K, a distance L exists between the underside 71.1 of the reflection body 71 and the bottom 74 of the receptacle 70. The distance L can be specified in such manner so as to make possible certain distinction between the fluid level "full" and the fluid level "empty".

The light which is beamed from the light source 76 into the receptacle 70, vertically relative to the transparent window 75, is then deflected at the inner surfaces of the reflection body 71 and cast back to window 75, whereby the light beams extend parallel to each other at a distance, as is apparent from FIG. 13. As long as a significant fluid level exists in receptacle 70, the light on its path to the reflection body 71 and back again to the window 75 is damped or absorbed or scattered in the fluid so that only a fraction of the light intensity generated by the light source reaches the light detector 77 after deflection at the reflection body 71. The light intensity detected by the light detector 77 is then for example so low that it is below the sensitivity threshold of the light detector 77 or below a specific detection threshold of the light detector 77. The light detector therefore does not emit any signals which has the same meaning as "full" filling level.

If more and more fluid is removed from the receptacle 70, the fluid level continues to drop until the fluid level sinks below the level of the projection 79, as is represented in FIG. 13. The reflection body 71 is here in the K position, as depicted, and a zero fluid level exists, at which the receptacle 70 is essentially empty. The orthogonal side surfaces of the recess 73 then redirect in the position K of the reflection body 71 the light from the light source 76 and reflect it back to the photo detector 77. Inasmuch as the light beam within receptacle 70 crosses for example air on its path, and, consequently, significantly lower damping of the light beam exists, the received light intensity or light volume lies above the detection threshold of the light detector 77, which, consequently, generates, at its exit, an electrical signal which indicates a fill level of "empty". The level or flush projection 79 prevents that a last residual fill level might falsify the result of the detection, since the remaining fluid has run off from the surface of the projection 79 into the adjacent recessed or lower lying areas.

Figure 14:
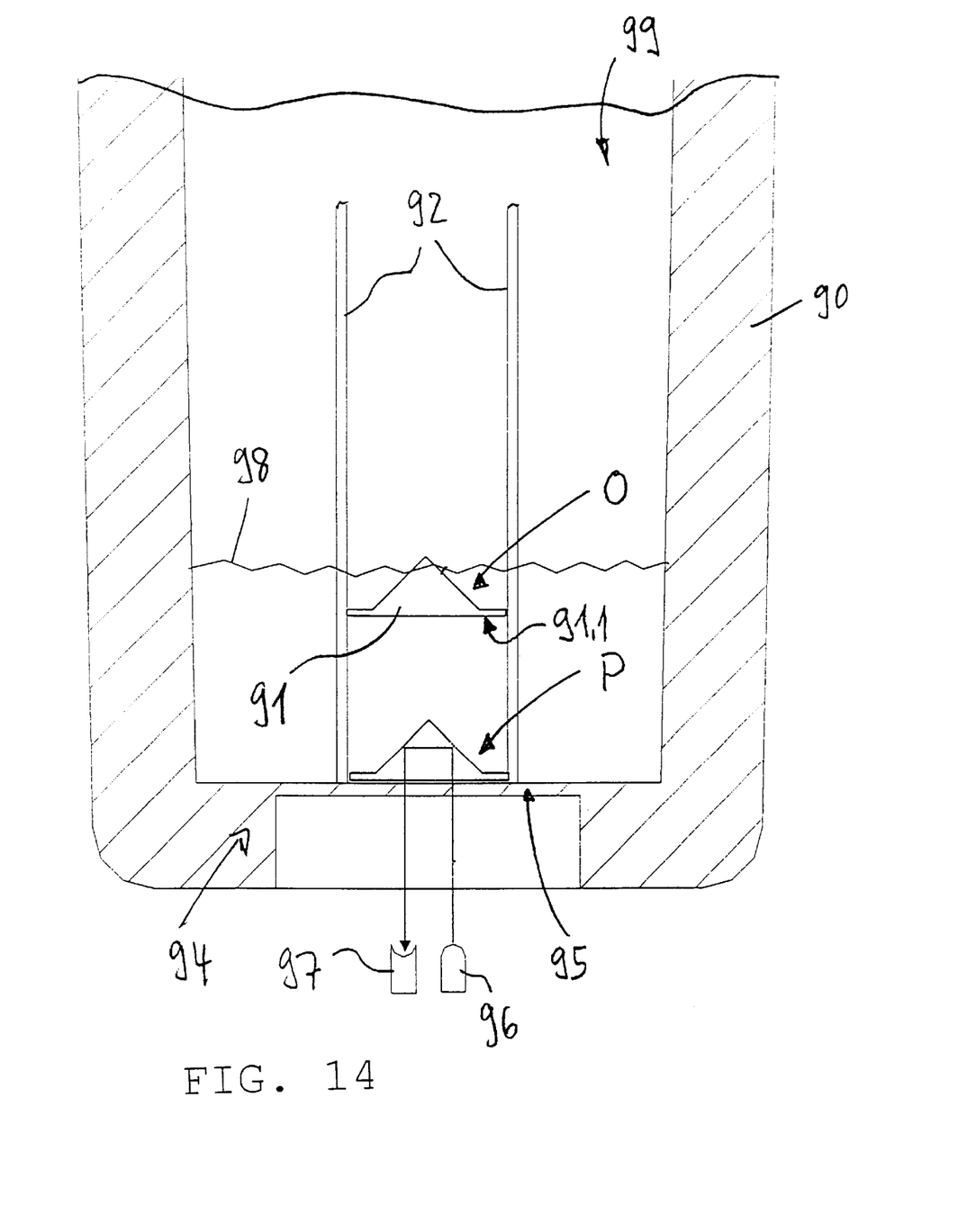

A sixth specific embodiment is depicted in FIG. 14. The system comprises a receptacle 90 according to the invention with a bottom 94, in which is provided a level, transparent, light-permeable window 95, a reflection body 91 in the interior or in a fluid chamber 99 of the receptacle, a light source 96, which emits light into the chamber 99 of the receptacle 90 and a light detector 97, which detects light from chamber 99.

The reflection body 91 consists of a transparent material, is designed as float and has the shape of a deviating prism with a level underside 91.1, which points toward the bottom 94 of the receptacle 90, and a tip, which points away from the receptacle bottom 94 or the transparent window 95.

The reflection body 91 is guided in a guideway 92 in its movement with the fluid level. The guideway 92 can be realized, for example, as spring-groove system, which is arranged at two opposite external sides of the reflection body 91. The reflection body 91 moves linear or in a straight line together with the fluid level. The reflection body 91, from the aspect of its volume or its material density is designed in such manner that it is essentially immersed in the fluid, for example the ink of an inkjet printer, and the two deviation points or deviation locations of the light beam from the light source 96 at the surface of the deviating prism or the reflection body 91 lie under the respective fluid level.

The refractive index of the fluid and of the material of the reflection body 91 are essentially the same or adapted to each other and, in the event that ink is involved, essentially identical to the refractive index of water. The air in the receptacle 90, however, has a substantially lower refractive index, namely in approximation to the refractive index of vacuum.

If fluid is removed from the formerly full receptacle 90, the fluid level in the fluid chamber 99 of the receptacle 90 then drops for example to fluid level 98 and the reflection body 91 is then in position G, which is depicted in FIG. 14. The light which is beamed from the fight source 96 into the receptacle 90, perpendicular to the transparent window 95, then exits from the surface of the transparent deviating prism into the fluid at the first deviation point, is there diffusely distributed or scattered and, consequently, can no longer reach the light detector 97. The light detector therefore does not emit any signals which has the same meaning as "full" fill level.

If more and more fluid is removed from the receptacle 90, the fluid level continues to drop until the reflection body 91 is positioned at the bottom 94 in the fluid chamber 99 of the receptacle 90. The reflection body 91 is then in the depicted position P and zero fluid level exists, at which the receptacle 90 is empty. At the border area between the deviating prism or the reflection body 91 and the air in the receptacle 90, the light is reflected from the light source 99, that is to say at the two deviating points, and cast back to the photo detector 97, which, as a result, generates at its exit an electrical signal which indicates a fill level of "empty". A corresponding beam path is plotted in for the position P in FIG. 14.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A system for detecting a level of a fluid contained within a fluid chamber of a receptacle, the system comprising:
   a light source directing a beam of light in a path into the fluid chamber of said receptacle;
   a reflection member disposed within said fluid chamber along said path and being movable relative to the receptacle based said level of the fluid contained within the receptacle, the reflection member reflecting said beam of light as a reflected beam of light having an intensity related to a position of the reflection member relative to the receptacle; and,
   a light detector positioned to receive the reflected beam of light and adapted to determine said level of the fluid contained within the fluid chamber based on said intensity of the reflected beam of light.

2. The system according to claim 1 wherein the reflection member defines an outer surface with segments of variable light reflection capability.

3. The system according to claim 2 wherein at least a portion of said outer surface of the reflection member defines a first recess.

4. The system according to claim 3 wherein said first recess has two opposed side surfaces which extend relative to each other in an orthogonal fashion.

5. The system according to claim 3 wherein said first recess creates an uneven distribution of mass of the reflection member.

6. The system according to claim 3 further including an insert disposed in said first recess.

7. The system according to claim 6 wherein said insert creates an imbalance of mass of the reflection member.

8. The system according to claim 3 wherein the reflection member defines at least one hollow space extending through the reflection member.

9. The system according to claim 8 wherein the at least one hollow space defined in the reflection member is opened to said fluid chamber of the receptacle.

10. The system according to claim 9 wherein:
the reflection member defines a cylinder; and,
the at least one cylindrical hollow space extends parallel to a central axis of the cylinder and continuously between opposite end surfaces of the cylinder.

11. The system according to claim 10 wherein the at least one cylindrical hollow space includes exactly two cylindrical hollow spaces extending through said cylinder parallel to said central axis.

12. The system according to claim 11 wherein:
a first fictitious plane is defined through said cylinder along said central axis, the first fictitious plane dividing the cylinder into a first half and a second half;
said recess and said first hollow space are formed in said first half of said cylinder;
said second hollow space is formed in said second half of said cylinder; and,
said first and second hollow spaces define central axes which extend in parallel with said central axis in a second fictitious plane defined through said cylinder, the second fictitious plane intersecting obliquely with said first fictitious plane in the central axis of the cylinder.

13. The system according to claim 12 wherein a distance between a central axis of said first hollow space relative to said central axis of said cylinder, and a distance of a central axis of said second hollow space relative to said central axis of said cylinder are the same.

14. The system according to claim 13 further including a second recess formed in said second half of said cylinder.

15. The system according to claim 3 wherein:
said reflection member is cylindrical shaped and defines a central axis; and,
the reflection member is arranged rotatably around said central axis in said fluid chamber of the receptacle.

16. The system according to claim 3 wherein said outer surface of the reflection member defines at least one second recess.

17. The system according to claim 16 wherein the reflection member is cylindrically shaped.

18. The system according to claim 17 wherein said first recess and said at least one second recess are formed about the circumference of the cylindrically shaped reflection member.

19. The system according to claim 18 wherein exactly two recesses are formed on opposite sides of the cylindrically shaped reflection member.

20. The system according to claim 1 wherein said reflection member has an inhomogeneous distribution of mass.

21. The system according to claim 1 further including a transport window formed in a wall of said receptacle, said beam of light being directed into said fluid chamber of the receptacle through said transparent window.

22. The system according to claim 21 wherein said window defines a blunt projection extending into an interior of said receptacle.

23. The system according to claim 1 wherein said reflection member is pivotally connected at an articulation at a wall of the receptacle by a rigid suspension member, the reflection member being movable in a circular path around an articulated axis defined at said articulation point.

24. The system according to claim 1 further including a guide way adapted to guide said reflection member in movement relative to said receptacle based on said level of the fluid within the fluid chamber of the receptacle.

25. The system according to claim 1 further including:
a suspension member for attaching said reflection member to a lid of said receptacle, said reflection member moving together with said level of the fluid contained within said fluid chamber of the receptacle.

26. The system according to claim 25 wherein an underside of said reflection member defines a recess, and walls of said recess re-direct said light beam from said light source.

27. The system according to claim 1 wherein said reflection member is a prism shaped float movable relative to the receptacle based on said level of the fluid contained within the receptacle.

28. The system according to claim 27 wherein said prism shaped float is adapted to re-direct said beam of light from said light source into said light detector when said receptacle is empty of said fluid.

29. The system according to claim 27 further including a guide way in the fluid chamber of the receptacle, said guide way guiding said reflection member along a straight line movement path within said receptacle.

30. An ink cartridge for use with an associated ink jet printer including a light source directing a beam of light in a path toward said cartridge and a light detector positioned to receive a reflected beam of light from the cartridge and adapted to determine a level of fluid contained within the cartridge based on an intensity of the reflected beam of light, the ink cartridge comprising:
a set of receptacle walls defining a fluid chamber for containing ink within the cartridge; and,
a reflection body floatable on said fluid contained within the cartridge, the reflection body being movable relative to a receptacle wall of the cartridge based on a level of the fluid contained within the receptacle, the reflection body reflecting said beam of light from said light source as a reflected beam of light toward said light detector, the reflected beam of light having an intensity related to a position of the reflection body relative to said receptacle wall.

31. The system according to claim 30 wherein the reflection body defines an outer surface with segments of variable light reflection capability.

32. The system according to claim 31 wherein at least a portion of said outer surface of the reflection body defines a first recess.

33. The system according to claim 32 wherein said first recess has two opposed side surfaces which extend relative to each other in an orthogonal fashion.

34. The system according to claim 32 wherein said first recess creates an uneven distribution of mass of the reflection body.

35. The system according to claim 32 further including an insert disposed in said first recess.

36. The system according to claim 35 wherein said insert creates an imbalance of mass of the reflection body.

37. The system according to claim 32 wherein the reflection body defines at least one hollow space extending through the reflection body.

38. The system according to claim 37 wherein the at least one hollow space defined in the reflection body is opened to said fluid chamber of the receptacle.

39. The system according to claim 38 wherein:
the reflection body defines a cylinder; and,
the at least one cylindrical hollow space extends parallel to a central axis of the cylinder and continuously between opposite end surfaces of the cylinder.

40. The system according to claim 39 wherein the at least one cylindrical hollow space includes exactly two cylindrical hollow spaces extending through said cylinder parallel to said central axis.

41. The system according to claim 40 wherein:
a first fictitious plane is defined through said cylinder along said central axis, the first fictitious plane dividing the cylinder into a first half and a second half;
said recess and said first hollow space are formed in said first half of said cylinder; and,
said first and second hollow spaces define central axes which extend in parallel with said cylinder, the second fictitious plane in the central axis of the cylinder.

42. The system according to claim 41 wherein a distance between a central axis of said first hollow space relative to said central axis of said cylinder, and a distance of a central axis of said cylinder are the same.

43. The system according to claim 42 further including a second recess formed in said second half of said cylinder.

44. The system according to claim 32 wherein:
said reflection body is cylindrical shaped and defines a central axis; and,
the reflection body is arranged rotatably around said central axis in said fluid chamber of the receptacle.

45. The system according to claim 32 wherein said outer surface of the reflection body defines at least one second recess.

46. The system according to claim 45 wherein the reflection body is cylindrically shaped.

47. The system according to claim 46 wherein said first recess and said at least one second recess are formed about the circumference of the cylindrically shaped reflection body.

48. The system according to claim 47 wherein exactly two recesses are formed on opposite sides of the cylindrically shaped reflection body.

49. The system according to claim 30 wherein said reflection body has an inhomogeneous distribution of mass.

50. The system according to claim 30 further including s transparent window formed in a wall of said receptacle, said beam of light-being directed into said chamber of the receptacle through said transparent window.

51. The system according to claim 50 wherein said window defines a blunt projection extending into an interior of said receptacle.

52. The system according to claim 30 wherein said reflection body is pivotally connected at an articulation at a wall of the receptacle by a rigid suspension member, the reflection body being movable in a circular path around an articulated axis defined at said articulation point.

53. The system according to claim 30 further including a guide way adapted to guide said reflection body in movement relative to said receptacle based on said level of the fluid within the fluid chamber of the receptacle.

54. The system according to claim 30 futher including:
a suspension member for attaching said reflection body to a lid of said receptacle, said reflection body moving together with said level of the fluid contained within said fluid chamber of the receptacle.

55. The system according to claim 54 wherein an underside of said reflection body defines a recess, and walls of said recess re-direct said light beam from said light source.

56. The system according to claim 30 wherein said reflection body is a prism shaped float movable reative to the receptacle based on said level of the fluid contained within the receptacle.

57. The system according to claim 56 wherein said prism shaped float is adapted to re-direct said beam of light from said light source into said light detector when said receptacle is empty of said fluid.

58. The system according to claim 56 further including a guide way said guide way guiding said reflection body along a stright line movement path within said receptacle.

* * * * *